United States Patent [19]

Okamura

[11] Patent Number: 5,548,787
[45] Date of Patent: Aug. 20, 1996

[54] BUS CYCLE TIMING CONTROL CIRCUIT HAVING BUS CYCLE ENABLE/DISABLE SIGNAL DICTATED BY COUNT MEANS USING COMPARISON OF PREDETERMINED AND DESTINATION ADDRESSES FOR INITIAL COUNT

[75] Inventor: Atsushi Okamura, Tokyo, Japan

[73] Assignee: NEC Corporation, Tokyo, Japan

[21] Appl. No.: 144,975

[22] Filed: Oct. 27, 1993

[30] Foreign Application Priority Data

Oct. 27, 1992 [JP] Japan ..................................... 4-288041

[51] Int. Cl.$^6$ ..................................................... G06F 9/00
[52] U.S. Cl. ...................... 395/845; 395/878; 364/240.5; 364/242.92; 364/271.6; 364/DIG. 1
[58] Field of Search ..................................... 395/275, 550, 395/825, 872, 876, 877, 433, 432, 250, 845, 878

[56] References Cited

U.S. PATENT DOCUMENTS 5,155,812  10/1992  Ehlig et al. .............................. 395/275
5,201,036  4/1993  Yoshimatsu ............................. 395/325

Primary Examiner—Thomas C. Lee
Assistant Examiner—Sang Hui Kim
Attorney, Agent, or Firm—Whitham, Curtis, Whitham & McGinn

[57]  ABSTRACT

A bus cycle timing control circuit that includes a timing control circuit that responds to a data request form a CPU and generates various read/write control signals for the purpose of controlling a bus cycle, a latch for storing a numerical value N, a register for holding a constant number "0", and a counter that starts counting down from the numerical value N held in the latch in response to the completion of one read/write control control signal. The timing control circuit includes a bus cycle start enable/disable circuit for generating a bus cycle start enable/disable signal which inhibits the start of a next bus cycle until the count value of the counter reaches the number "0" and which permits the start of the next bus cycle when the count value of the counter reaches the number "0".

3 Claims, 5 Drawing Sheets

1

BUS CYCLE TIMING CONTROL CIRCUIT HAVING BUS CYCLE ENABLE/DISABLE SIGNAL DICTATED BY COUNT MEANS USING COMPARISON OF PREDETERMINED AND DESTINATION ADDRESSES FOR INITIAL COUNT

BACKGROUND OF THE INVENTION

1. Field of the Invention

The present invention relates to a bus cycle timing control circuit for use in a microprocessor, and more specifically to a bus cycle timing controlling circuit for controlling a bus cycle in a data transfer between an external memory or an I/O (input/output) device and a microprocessor.

2. Description of Related Art

In general, a CPU (central processing unit) of a microprocessor is configured to generate a control signal for control a bus used for the transfer of data between the microprocessor and the memory or others. An external device such as a memory or an I/O device carries out the transfer of data through the bus, during a predetermined period of time corresponding to the control signal generated by the CPU.

A low access speed of the external device is compensated for by sending a ready signal to the microprocessor. A bus cycle is started with a request generated from an internal of the microprocessor, and continuous bus cycles are generated with no interval between the bus cycles.

Referring to FIG. 1, there is shown a timing chart illustrating one example of the bus cycle. In FIG. 1, a read/write signal R/W indicates whether the bus cycle being executed is for a reading or for a writing, and a bus cycle start signal BCS shows a start of the bus cycle. In addition, a data strobe signal ST is indicates that the bus cycle is a read/write cycle of data, and a ready signal RY is a control signal for designating whether or not the bus cycle is to be extended. Each of bus cycles BS is composed of a plurality of bus states exemplified by T1, T2, T3, T4, etc., and is carried out in synchronism with a clock CK. An address A shows an address to be accessed by the microprocessor, and data D indicates data to be read or written.

Now, the operation of the bus cycle will be explained with reference to FIG. 1.

In a bus state T1 of a first bus cycle "BUS CYCLE 1", the microprocessor outputs a first address A, and simultaneously brings the read/write signal R/W into a read condition and activates the bus cycle start signal BCS. In a bus state T2, the data strobe signal ST is activated, and the bus cycle start signal BCS is inactivated. In a bus state T3, data D is read out from a memory to the data bus, and the ready signal RY is activated. The microprocessor receives the ready signal RY and fetches the data D from the data bus. In a bus state T4, the microprocessor inactivates the data strobe signal ST, and the memory inactivates the data bus. Thus, one bus cycle is completed.

In the bus state T1 of the second bus cycle "BUS CYCLE 2", the microprocessor outputs the next address A and data D to be written, and simultaneously brings the read/write signal R/W into a write condition and activates the bus cycle start signal BCS. In a bus state T2, the data strobe signal ST is activated, and the bus cycle start signal BCS is inactivated. In a bus state T3, data D on the data bus is written into the memory, and the ready signal RY is activated. The microprocessor receives the ready signal RY. In a bus state T4, the microprocessor inactivates the data strobe signal ST, and removes the data D on the data bus. Thus, another bus cycle is completed.

An LSI (large scaled integrated circuit) for the I/O device can be one of the external devices having a slow access speed. FIG. 2A shows a timing chart illustrating one example of an access operation in a conventional I/O device. In FIG. 2A, both a read control signal and a write control signal are a negative active logic.

Since this type of LSI for the I/O device does not cope with the microprocessor having a high operation speed, it is necessary, as shown in FIG. 2A at the time of the access, to ensure set-up times $t_{SAR}$ and $t_{SAW}$ and hold times $t_{HAR}$ and $t_{HAW}$ for an address A and a chip select signal CS, set-up times $t_{DRD}$ and $t_{SDW}$ for the data, and an access interval $t_{RV}$. The access interval $t_{RV}$ is realized by inserting an instruction independent of an I/O cycle, between continuous access instructions in an actual operation, in the software.

A typical example of the memory is a DRAM (dynamic random access memory). FIG. 2B is a timing chart illustrating one example of an operation of continuous read cycles in a conventional DRAM. In FIG. 2B, a row address strobe signal RAS is a negative active logic, and controls a timing for latching a row address and a timing for reading a row memory cell, and a column address strobe signal CAS is a negative active logic, and controls a timing for latching a column address and a timing for selecting a column memory cell. A row/column address signal ADDR is a multiplexed signal of the row address and the column address.

Now, the procedures for the memory accessing will be described. First, a first half of an address bus of the CPU is given to the DRAM. The row address strobe signal RAS is activated. Next, the remaining half of the address bus is given to the DRAM. A write enable signal WE of a positive active logic is activated, and the column address strobe CAS is activated. An output signal appears on a data output DO. Thereafter, the row address strobe signal RAS and the column address strobe signal CAS are inactivated. The data output DO is brought into a high impedance condition, so that the signal outputting is stopped.

In order to make it easy to couple a memory or I/O device of a low speed to the microprocessor, there has been known a programmable wait controller configured to automatically insert into the bus cycle a wait time (wait state) corresponding to a time period of 0 (zero) clock to any desired number of clocks.

As shown in FIG. 3, this programmable wait controller includes a latch 1 for latching data on an internal data bus, and a counter 8 receiving a clock CK through a NAND gate $G_1$ for down-counting the received clocks by the number designated by the data latched in the latch 1. When the down-counting reaches the designated number, an output of the counter 8 is supplied to one input of a flipflop composed of NAND gates $G_6$ and $G_7$. An output of the flipflop is outputted through AND gates $G_4$ and $G_3$ as the ready signal RY. The read signal RD and the write signal WE are inputted to a NAND gate $G_5$, whose output is connected to an inverter $G_2$ and the other input of each of the gates $G_1$, $G_3$ and $G_6$. An output of the inverter $G_2$ is also connected to the counter 8. This programmable wait controller is incorporated in a microprocessor commercially available from NEC Corporation under the tradename mPD70216, and therefore, further explanation will be omitted.

In the shown programmable wait controller, the counter 8 operates to down-count the clock CK from the number stored in the latch circuit 1, and a wait state or states corresponding to the number of the clocks CK counted are generated so as to control an internal ready RY. With this arrangement, a ROM or an I/O device having a fixed access time can be connected to the microprocessor through only a simple decode circuit.

Some types of microprocessors have been configured to automatically set an interval between continuous I/O bus cycles. For example, this corresponds to insertion of a bus cycle having a fixed length of three clocks in a continuous access to the low speed I/O device as mentioned above. FIG. 2C illustrates a timing chart of the continuous I/O bus cycle. In FIG. 2C, the bus cycles "BUS CYCLE 1" and "BUS CYCLE 3" are continuous, but a bus cycle "BUS CYCLE 2" composed of three wait states Ti is inserted between the continuous bus cycles "BUS CYCLE 1" and "BUS CYCLE 3" for the purpose of the recovery.

As will be apparent from the above, the conventional bus cycle timing control is featured in that the microprocessor is provided with the wait circuit for inserting a fixed wait so as to control the access time in order to cope with a low speed external device such as a memory or an I/O device. However, the external memory and the I/O device prescribe not only the access time but also a recovery time between the bus cycles. Therefore, it is necessary to externally connect a sequencer formed of complicated circuits to insert a continuous access a wait time in order to meet the prescribed values which are different for each of the memory and the I/O device to be coupled. Alternatively, it is necessary to deal with a portion of the wait time generation in a software manner. These are disadvantageous. In the case of dealing with a portion of the wait time generation in a software manner, at each time the clock frequency is changed or the access time of the memory or another to be coupled changes, it is necessary to completely rewrite a portion of the software corresponding to the changed portion. This is also disadvantageous.

SUMMARY OF THE INVENTION

Accordingly, it is an object of the present invention to provide a bus cycle timing control circuit which has overcome the above mentioned defect of the conventional circuits.

Another object of the present invention is to provide a bus cycle timing control circuit having a simple circuit construction making it possible to couple a microprocessor to a low speed external device such an a low speed memory or I/O device.

The above and other objects of the present invention are achieved in accordance with the present invention by a bus cycle timing control circuit comprising:

a timing control circuit responding to a data request form a central processing unit so as to control a bus cycle and to generate a read/write control signal;

a first circuit for storing a predetermined first value;

a second circuit for storing a predetermined second value; and a counting circuit responding to completion of the read/write signal to start its counting operation of a clock from the first value, the timing control circuit including a bus cycle start enable/disable signal generating means generating a bus cycle start disable signal which inhibits a start of a next bus cycle corresponding to a next data request from the central processing unit until the count value of the counting circuit reaches the second value, the bus cycle start enable/disable signal generating means generating a bus cycle start enable signal which permits the start of the next bus cycle when the count value of the counting circuit reaches the second value.

The above and other objects, features and advantages of the present invention will be apparent from the following description of preferred embodiments of the invention with reference to the accompanying drawings.

DESCRIPTION OF THE PREFERRED EMBODIMENTS

Figure 1:
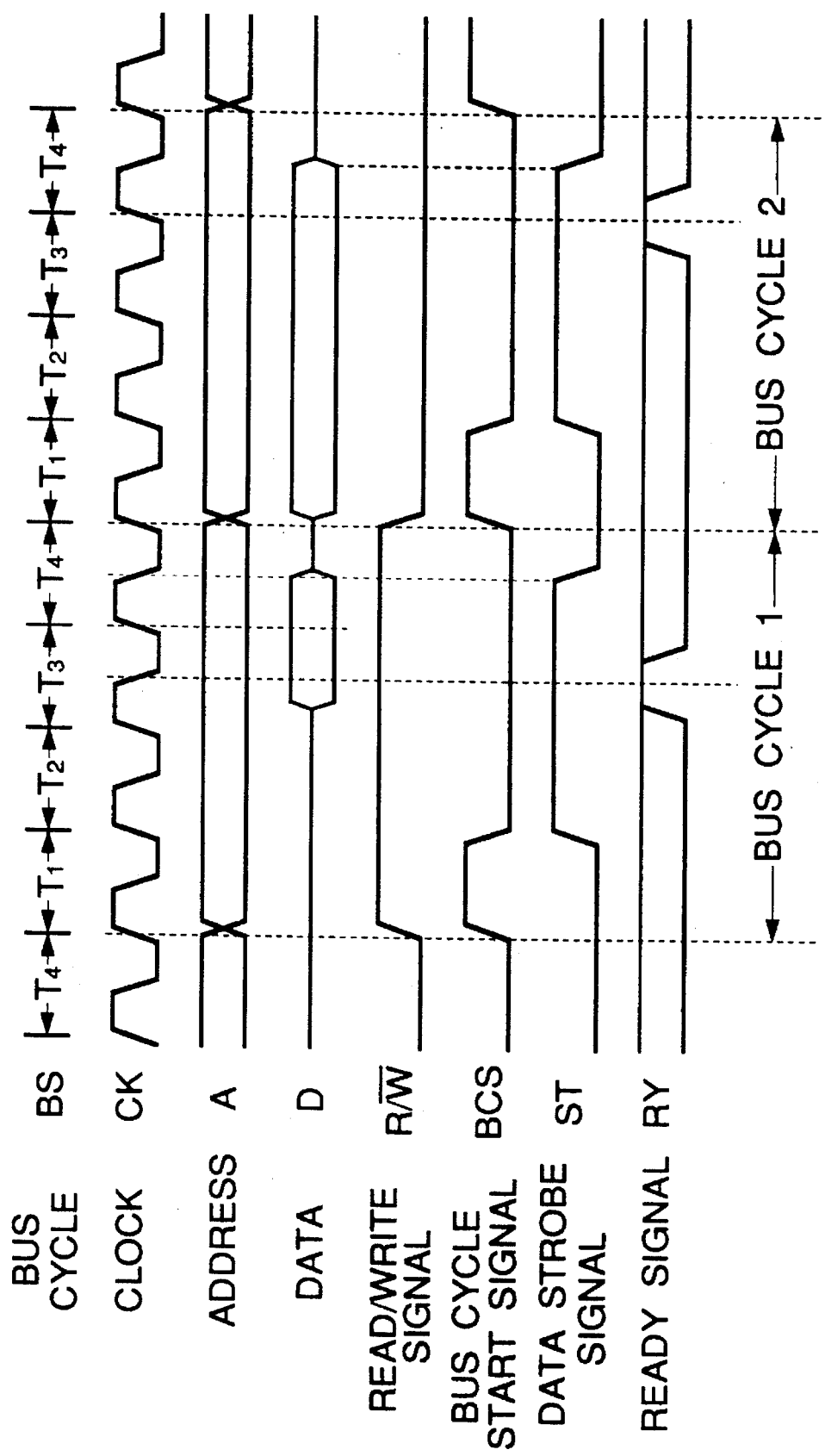
FIG. 1 is a timing chart illustrating one example of the bus cycle in the conventional microprocessor.
Figure 2A:
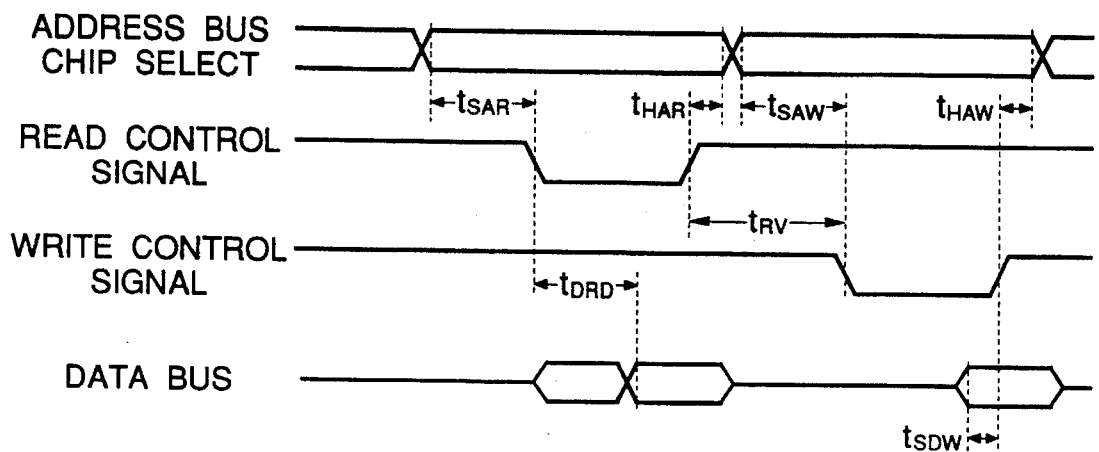
FIG. 2A is a timing chart illustrating one example of an access operation in a conventional I/O device.
Figure 2B:
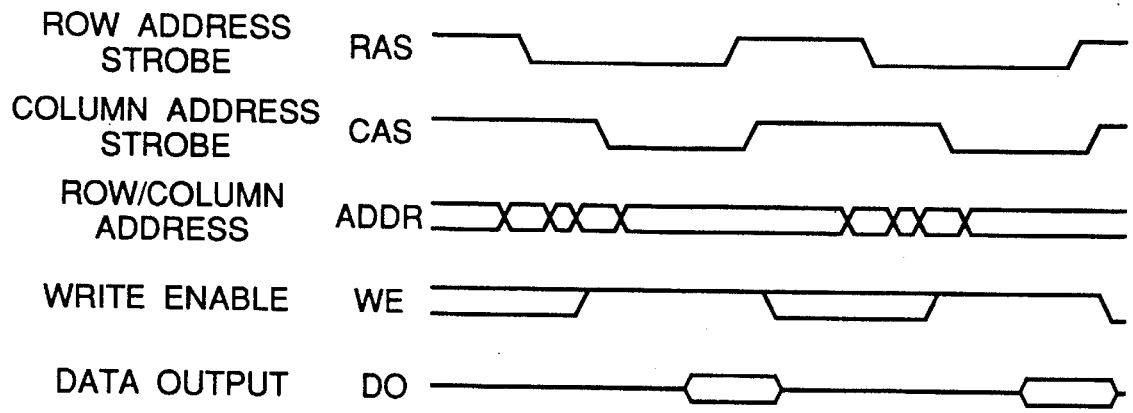
FIG. 2B is a timing chart illustrating one example of an operation of continuous read cycles in a conventional DRAM.
Figure 2C:
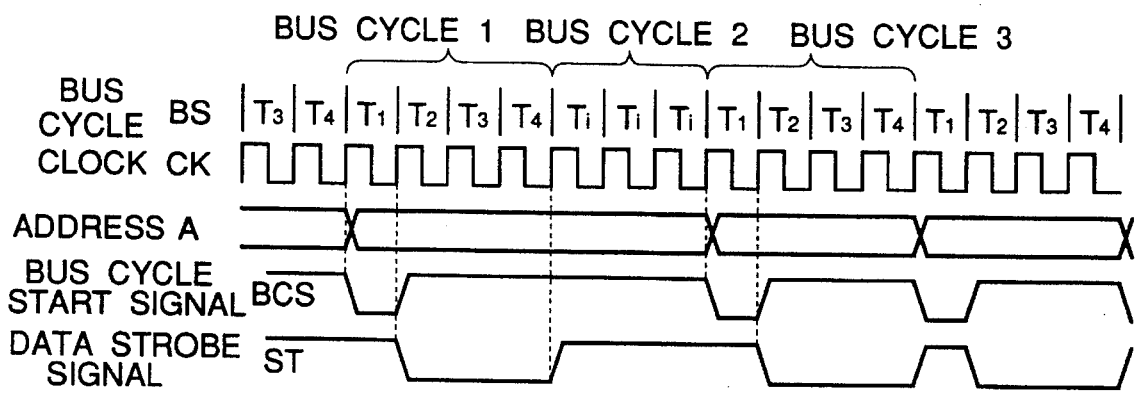
FIG. 2C illustrates a timing chart of the continuous I/O bus cycle.
Figure 3:
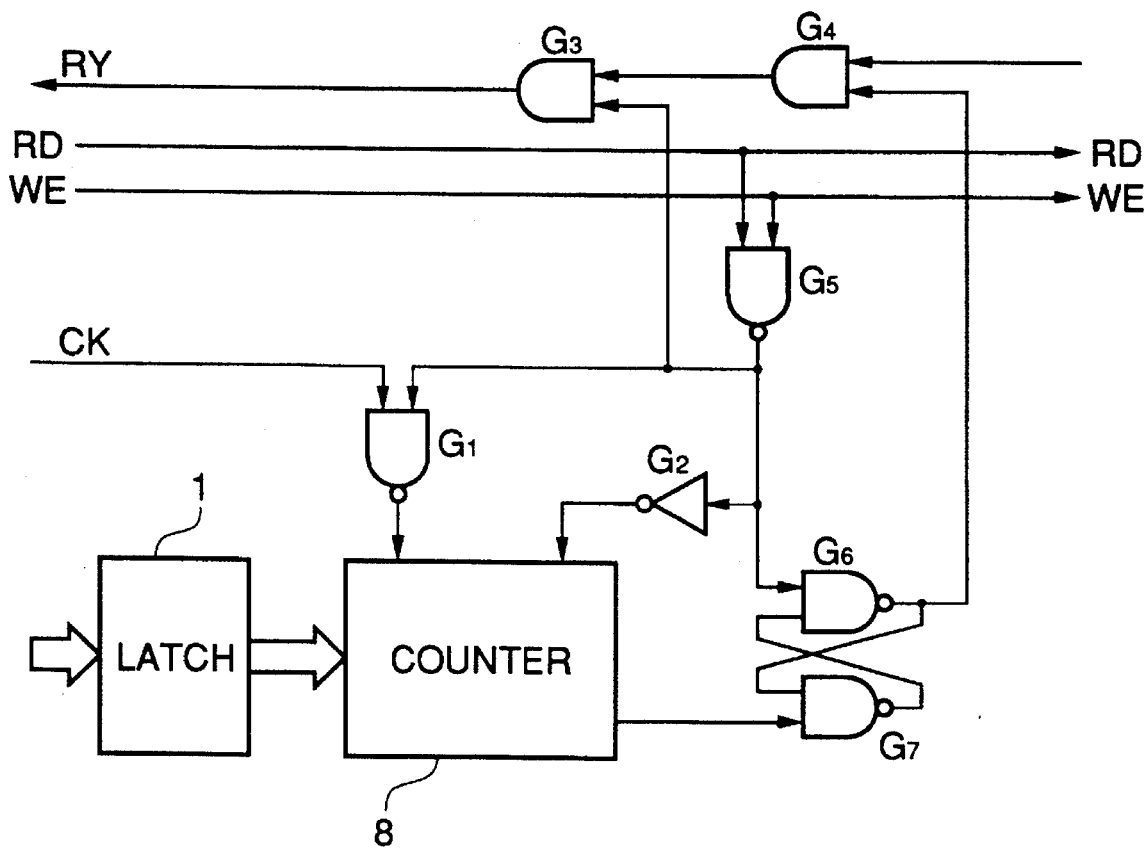
FIG. 3 is a block diagram of one example of a conventional programmable wait controller.
Figure 4:
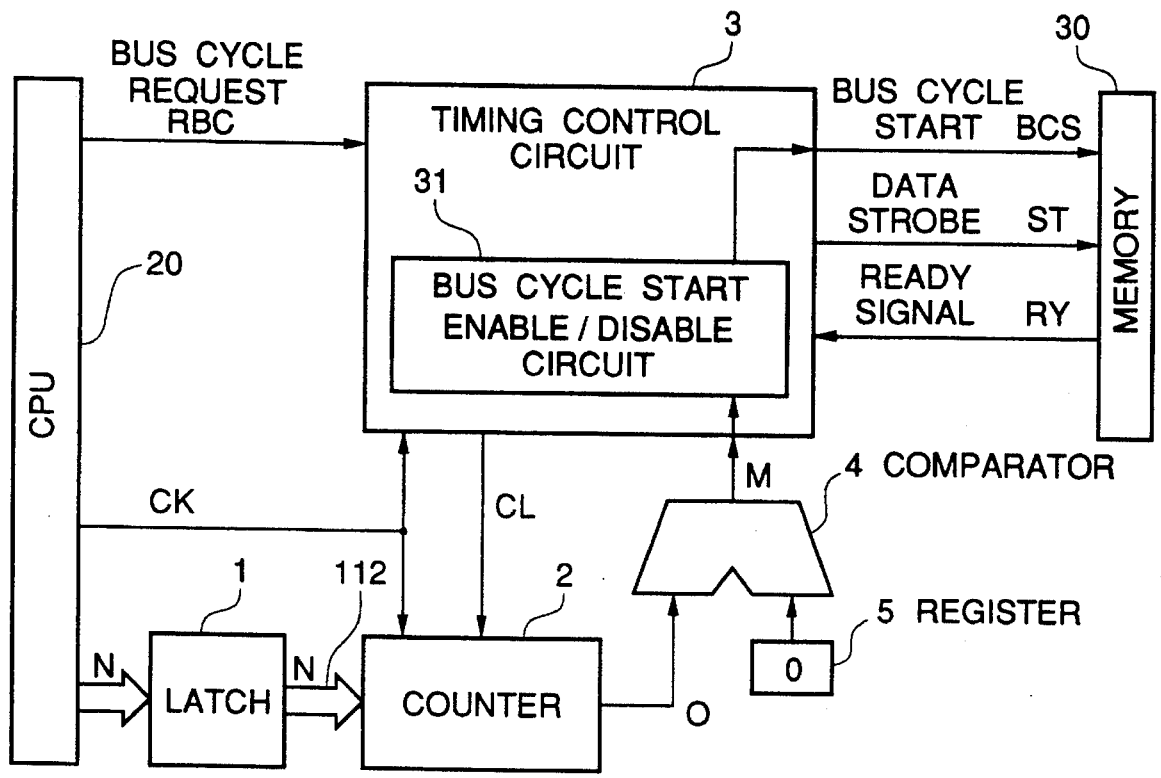
FIG. 4 is a block diagram of a first embodiment of the bus cycle timing control circuit in accordance with the present invention.
Figure 5:
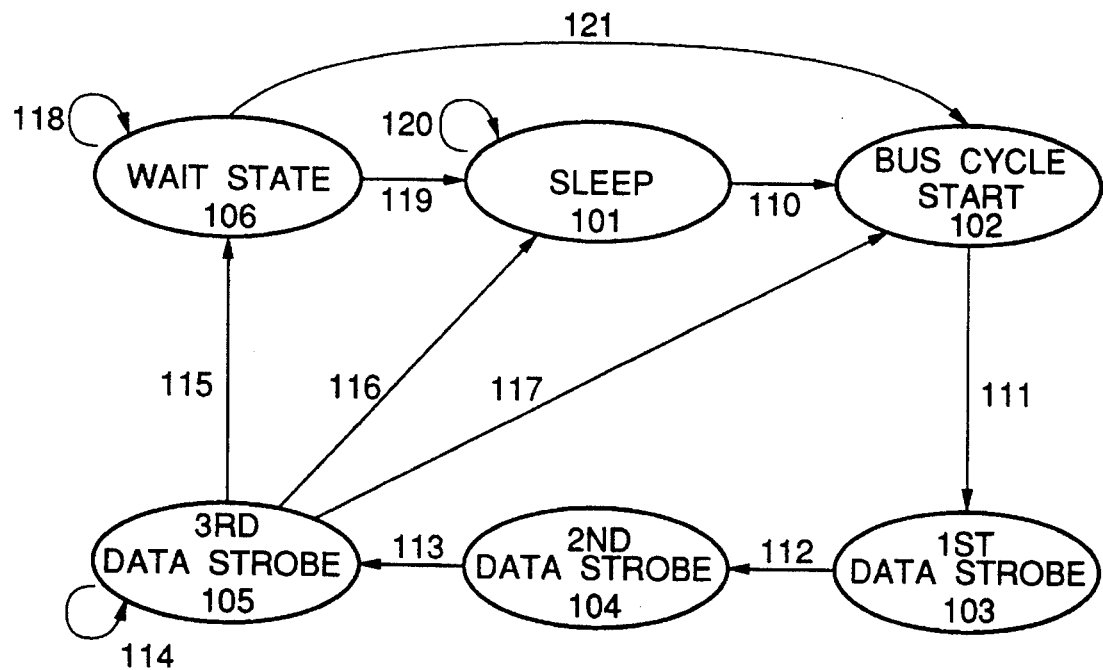
FIG. 5 is a state transition table illustrating an operation of the bus cycle timing control circuit shown in FIG. 4.

Referring to FIG. 4, there is shown a block diagram of a first embodiment of the bus cycle timing control circuit in accordance with the present invention.

The shown bus cycle timing control circuit mainly includes a latch circuit 1 for latching input data or numerical value N through an internal bus from a CPU 20, a counter 2 configured to count down a clock CK from the number corresponding to the data value latched in the latch circuit 1, a timing control circuit 3 acting in response to a data request or bus cycle request RBC from the CPU 20 to control a bus cycle by generating various data read/write control signals including a bus cycle start signal BCS and a data strobe signal ST to a low access speed external device such as an external memory 30, a comparator 4 and a register 5 having a constant number "0". The timing control circuit 3 comprises therein a bus cycle start enable/disable circuit 31 for generating a bus cycle start enable/disable signal.

Now, operation of the shown bus cycle timing control circuit will be described with reference to a state transition table of FIG. 4 illustrating an operation of the bus cycle timing controlling circuit.

When there is no bus cycle request, an internal state of the timing control circuit 3 is in a wait condition designated by a sleep 101. The condition is maintained as illustrated by Reference Numeral 120 if no bus cycle request is generated. If the timing control circuit 3 receives the bus cycle request RBC from the CPU 20 at a timing of any clock, which is called CK1 here, the internal state of the timing control circuit 3 goes into a bus cycle start 102. Simultaneously, a count/load signal CL is brought into a load condition so that the numerical value N stored in the latch circuit 1 is written into the counter 2.

At the timing of a next clock which is called CK2 here, the internal state of the timing control circuit 3 moves into a first data strobe 103, so that the timing control circuit 3 generates the data strobe signal ST to the external I/O device such as the memory 30. The count/load signal CL is maintained in the load condition. At the timing of the subsequent clock which is called CK3 here, the internal state of the timing controlling circuit 3 changes into a second data strobe 104, so that the data strobe signal ST and the count/load signal CL maintained in the load condition. At the timing of a the subsequent clock which is called CK4 here, the internal state of the timing control circuit 3 goes into a third data strobe 105. This third data strobe 105 is repeated as illustrated by Reference Numeral 114 until the input ready signal RY is activated.

When the timing control circuit 3 receives the ready signal RY from the external I/O device such as the memory 30, the timing control circuit 3 brings the count/load signal CL into a count condition so as to instruct the counter 2 to start its down-counting operation. The counter 2 starts to count down the clock CK from the numerical value N of the latch circuit 1, and outputs its count output "O".

This count output "O" is compared with the constant number "0" of the register 5 in the comparator 4. When the count output "O" becomes equal with the constant number "0", the comparator 4 activates its output signal M, which is supplied to the bus cycle start enable/disable circuit 31 of the timing control circuit 3. The bus cycle start enable/disable circuit 31 maintains the bus cycle start signal BCS in an inactive condition during a period of time in which the signal M is inactive. If the signal M is active, the bus cycle start enable/disable circuit 31 activates the bus cycle start signal BCS and brings the timing control circuit 3 in a condition capable of acknowledging a next bus cycle request. The following table shows a transition condition of the internal state of the timing control circuit 3 and its corresponding signal.

| STATE | TRANSITION DESTINATION | CONDITION | OUTPUT SIGNAL |
| --- | --- | --- | --- |
| sleep | bus cycle start 110 | bus request | load |
|  | sleep 120 | no bus request | load |
| bus cycle start | 1st data strobe 111 | unconditional | bus cycle start load |
| 1st data strobe | 2nd data strobe 112 | unconditional | data strobe load |
| 2nd data strobe | 3rd data strobe 113 | unconditional | data strobe load |
| 3rd data strobe | 3rd data strobe 114 | no ready signal | data strobe load |
|  | wait state 115 | count "0" output M is inactive | count |
|  | sleep 116 | count "0" output M is active and no bus request | load |
|  | bus cycle start 117 | count "0" output M is active and bus request | load |
| wait state | wait state 118 | count "0" output M is inactive | count |
|  | sleep 119 | count "0" output M is active and no bus request | load |
|  | bus cycle start 121 | count "0" output M is active and bus request | load |

Figure 6:
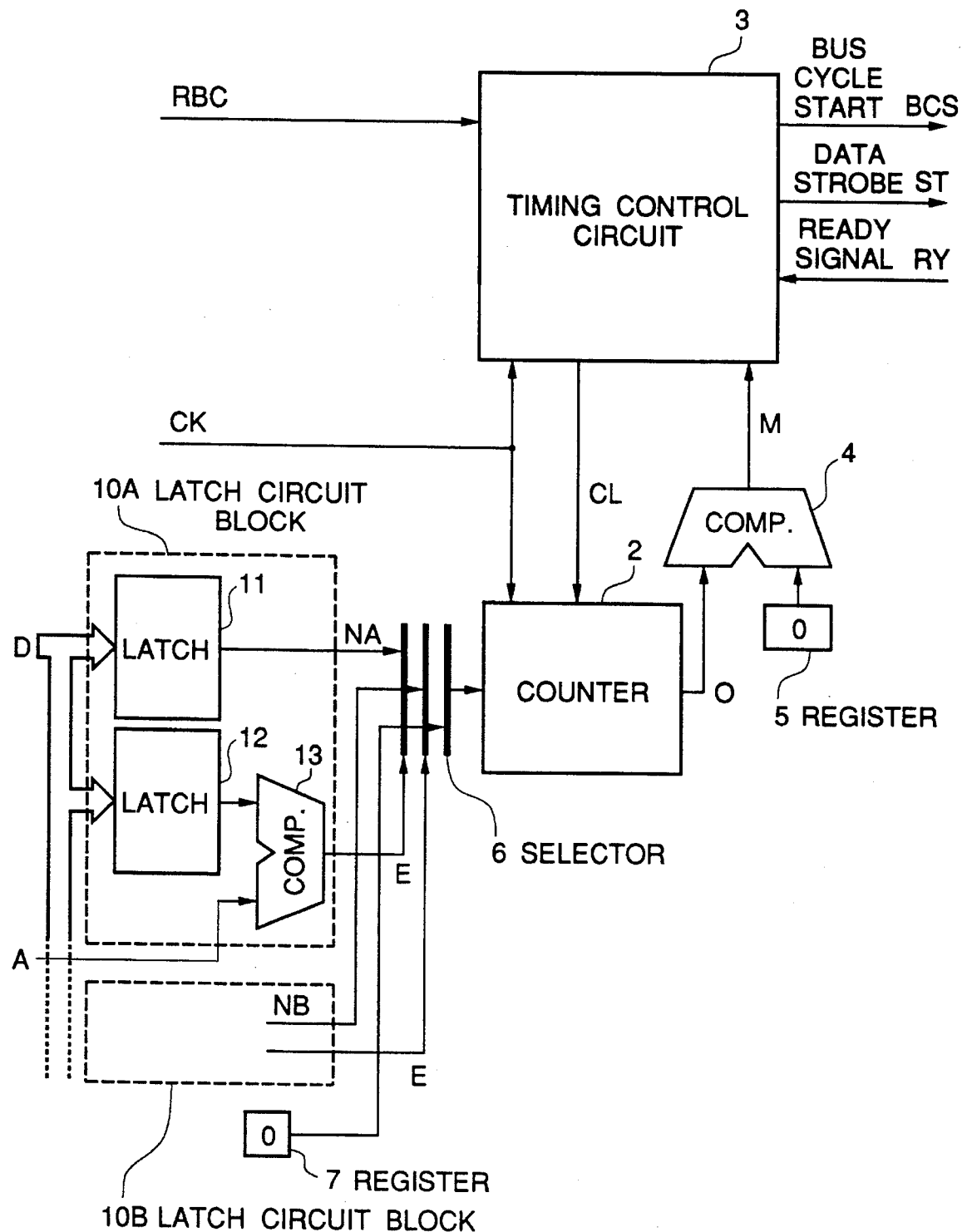
FIG. 6 is a block diagram of a second embodiment of the bus cycle timing control circuit in accordance with the present invention.

Now, referring to FIG. 6, there is shown a block diagram of a second embodiment of the bus cycle timing control circuit in accordance with the present invention. The second embodiment is different from the first embodiment in which the second embodiment includes, in place of the latch circuit 1 of the first embodiment, a plurality of latch circuit blocks 10A, 10B, . . . , each of which includes a pair of latch circuits 11 and 12 and a comparator 13, a selector 6 for selecting one of the latch circuit blocks 10A, 10B, . . . , and a register 7 holding a constant number "0". In FIG. 6, therefore, elements similar to those shown in FIG. 4 are given the same Reference Numerals, and explanation thereof will be omitted.

Operation of the second embodiment is also different from that of the first embodiment in which the numerical value N to be written into the counter 2 becomes different for an address of each destination to be accessed. In the latch circuit block 10A, similarly to the latch circuit 1, the latch circuit 11 receives and holds from the data bus D the clock number NA is to be counted by the counter 2 in order to designate a wait to be inserted into bus cycles. The latch circuit 12 holds an address of a destination to be accessed by inserting the wait time of clocks of the above mentioned clock number. If an access address A on an address bus is equal with the value held in the latch circuit 12, the comparator 13 enables its output signal E, so that the selector 6 selects the clock number or numerical value NA held in the latch circuit 11 so as to supply the selected numerical value NA to the counter 2.

Similarly, in the latch circuit block 10B, if the access address is equal with the value held in the latch circuit 12 (not shown) of the latch circuit block 10B, a numerical value NB held in the latch circuit 11 (not shown) of the latch circuit block 10B is selected and supplied to the counter 2.

If the access address is equal with neither the address held in the latch circuit block 10A not the address held in the latch circuit block 10B, the selector 6 selects the register 7 of the constant number "0". As a result, no clock is inserted between the continuous bus cycles.

As will be apparent from the above, the bus cycle timing control circuit in accordance with the present invention is characterized in that it comprises first and second memory circuits for storing a first value and a second value, respectively, a counting circuit responding to completion of a read/write control signal to start its counting operation of a clock from the first value, and a timing control circuit including a bus cycle start enable/disable signal generating means generating a bus cycle start enable/disable signal which inhibits a start of a next bus cycle until the count value of the counting circuit reaches the second value and which permits the start of the next bus cycle when the count value of the counting circuit reaches the second value. With this arrangement, the bus cycle timing control circuit in accordance with the present invention can be coupled through a simple connection circuit to a low access speed device such as an external memory or an I/O device. In addition, since it become unnecessary to set the wait in a software manner, compatibility of the software is elevated if the clock frequency is changed and even if the access time of the memory or other external device to be coupled changes.

The invention has thus been shown and described with reference to the specific embodiments. However, it should be noted that the present invention is in no way limited to the details of the illustrated structures but changes and modifications may be made within the scope of the appended claims.

I claim:

1. A bus cycle timing control circuit, comprising:

a timing control circuit for generating, in response to a data request from a central processing unit, a plurality of read/write control signals, said read/write control signals controlling a bus cycle:

a first circuit for receiving a predetermined first value from said central processing unit;

a second circuit, operatively coupled to said timing control circuit, for storing a predetermined second value; and a counting circuit, operatively coupled to said first circuit, for, in response to a completion of said plurality of read/write control signals, starting a counting operation from said first value to said second value, said timing control circuit including a bus cycle start enable/disable signal generating means for generating a bus cycle start disable signal which inhibits a start of a next bus cycle, corresponding to a next data request from said central processing unit, until the count value of said counting circuit is equivalent to said second value, said bus cycle start enable/disable signal generating means generating a bus cycle start enable signal for starting said next bus cycle when the count value of said counting circuit is equivalent to said second value, wherein, said central processing unit outputs a destination address to be accessed, wherein, said first circuit includes a first latch circuit for storing said first value, a second latch circuit for storing a predetermined address, and an address comparator for comparing said predetermined address stored in said second latch circuit with said destination address, and wherein, when said address comparator indicates that said predetermined address coincides with said destination address, said first value stored in said first latch circuit is supplied to said counting circuit.

2. A bus cycle timing control circuit adapted for use with an external device, comprising:

a timing control circuit for generating, in response to a data request from a central processing unit, a plurality of read/write control signals, said read/write control signals controlling a bus cycle, said timing control circuit including a bus cycle start enable/disable circuit;

a comparator coupled to said bus cycle start enable/disable circuit;

a latch circuit for receiving and latching a predetermined first numerical value from said central processing unit;

a register, operatively coupled to said comparator, for holding a predetermined second numerical value;

a counter operatively coupled to said comparator and being controlled by said timing control circuit, said counter for receiving said first numerical value when said timing control circuit receives a ready signal from said external device being accessed, and said counter starting a counting operation from said first numerical value when said timing control circuit receives said ready signal;

said comparator comparing a count value of said counter with said second numerical value held in said register, said comparator generating an active coincidence signal to said timing control circuit when said count value coincides with said second numerical value and generating an inactive coincidence signal when said count value does not coincide with said second numerical value, said bus cycle start enable/disable circuit for inhibiting generation of a bus cycle start signal for a next bus cycle when said coincidence signal from said comparator is inactive, said next bus cycle corresponding to a next data request from said central processing unit;

said bus cycle start enable/disable circuit allowing generation of the bus cycle start signal for said next bus cycle when said coincidence signal from said comparator is active;

a plurality of latch circuit blocks, at least first and second latch circuit blocks of said plurality of latch circuit blocks each including a first latch for storing said first numerical value, a second latch for storing a predetermined address, and an address comparator;

wherein, said central processing unit outputs a destination address to be accessed;

said address comparator for comparing said predetermined address with said destination address and for outputting an active coincidence output signal when said address comparator indicates that said predetermined address coincides with said destination address;

a second register, operatively coupled to said counter, for holding a predetermined third numerical value; and a selector receiving an output of said first latches of each of said first and second latch circuit blocks and an output of said second register, said selector being controlled by the coincidence output signal of said address comparator of each of said first and second latch circuit blocks;

wherein, when the coincidence output signal of said address comparator of said first latch circuit block is active, said first numerical value of said first latch of said first latch circuit block is output to said counter, wherein, when the coincidence output signal of said address comparator of said second latch circuit block is active, said first numerical value of said first latch of said second latch circuit block is output to said counter, and wherein, when the coincidence output signal of said address comparator of each of said first and second latch circuit blocks is inactive, said third numerical value of said second register is output to said counter.

3. A bus cycle timing control circuit connected to a low access speed external device outputting a ready signal, and a central processing unit outputting a bus cycle request, a first predetermined value, and a plurality of clock signals, said bus timing control circuit comprising;

a timing control circuit for receiving said bus cycle request, a first clock signal of said plurality of clock signals and said ready signal, outputting a bus cycle start signal and a data strobe signal to said low access speed external device, and for outputting a count/load signal indicating one of a load condition and a count condition;

a latch circuit for latching said first predetermined value;

a counter for receiving said first clock signal and for outputting a count value, said counter being controlled by said count/load signal so as to receive said first predetermined value as an initial value when said count/load signal indicates a load condition, and for performing a counting operation from said first predetermined value when said count/load signal indicates said count condition;

a register, operatively coupled to said counter, for holding a second predetermined value; and a comparator for receiving said count value and said second predetermined value and for activating a predetermined output signal when said count value coincides with said second predetermined value;

said timing control circuit including bus cycle start enable/disable signal generating means for outputting said bus cycle start signal only when said predetermined signal is active, such that a start of a next bus cycle is inhibited until said count value reaches said second predetermined value, said timing control circuit being configured such that when said central processing unit does not output said bus cycle request, said timing controlling circuit is maintained in a wait condition, wherein, when said central processing unit outputs said bus cycle request, said timing control circuit outputs said bus cycle start signal, and brings said count/load signal into said load condition;

wherein, when said central processing unit outputs a second clock signal of said plurality of clock signals after said first clock signal, said timing control circuit outputs said data strobe signal and maintains said count/load signal in said load condition;

wherein, until said ready signal is output from said low access speed external device, said timing control circuit continues outputting said data strobe signal and said count/load signal is maintained in said load condition; and wherein, when said ready signal is output, said timing control circuit brings said count/load signal into said count condition such that said counter starts said counting operation for each clock signal of said plurality of clock signals; and wherein, when said enable/disable signal generating means outputs said bus cycle start signal, said timing control circuit acknowledges said next bus cycle request, said timing control circuit further comprising:

a plurality of latch circuit blocks, at least first and second latch circuit blocks of said plurality of latch circuit blocks each including a first latch for storing said first numerical value, a second latch for storing a predetermined address, and an address comparator;

wherein, said central processing unit outputs a destination address to be accessed;

said address comparator for comparing said predetermined address with said destination address and for outputting an active predetermined output signal when said address comparator indicates that said predetermined address coincides with said destination address;

a second register, operatively coupled to said counter, for holding a predetermined third numerical value; and a selector receiving an output of said first latches of each of said first and second latch circuit blocks and an output of said second register, said selector being controlled by the predetermined output signal of said address comparator of each of said first and second latch circuit blocks;

wherein, when the predetermined output signal of said address comparator of said first latch circuit block is active, said first numerical value of said first latch of said first latch circuit block is output to said counter, wherein, when the predetermined output signal of said address comparator of said second latch circuit block is active, said first numerical value of said first latch of said second latch circuit block is output to said counter, and wherein, when the predetermined output signal of said address comparator of each of said first and second latch circuit blocks is inactive, said third numerical value of said second register is output to said counter.

* * * * *